United States Patent
Thrapp et al.

(10) Patent No.: US 12,514,450 B2
(45) Date of Patent: Jan. 6, 2026

(54) INTRAVASCULAR DUAL-MODALITY OCT AND MULTICHANNEL NIRF INFLAMMATION IMAGING

(71) Applicant: The General Hospital Corporation, Boston, MA (US)

(72) Inventors: Andrew D. Thrapp, Boston, MA (US); Osman O. Ahsen, Boston, MA (US); Guillermo J. Tearney, Boston, MA (US); Farouc A. Jaffer, Boston, MA (US); Joseph A. Gardecki, Boston, MA (US); Mohamad B. Kassab, Boston, MA (US); Adam Mauskapf, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 55 days.

(21) Appl. No.: 18/686,176

(22) PCT Filed: Aug. 23, 2022

(86) PCT No.: PCT/US2022/041171
§ 371 (c)(1),
(2) Date: Feb. 23, 2024

(87) PCT Pub. No.: WO2023/028032
PCT Pub. Date: Mar. 2, 2023

(65) Prior Publication Data
US 2024/0350011 A1    Oct. 24, 2024

Related U.S. Application Data (60) Provisional application No. 63/236,668, filed on Aug. 24, 2021.

(51) Int. Cl.
*A61B 5/00* (2006.01)
*G01N 21/64* (2006.01)

(52) U.S. Cl.
CPC ............ *A61B 5/0035* (2013.01); *A61B 5/004* (2013.01); *A61B 5/0066* (2013.01);
(Continued)

(58) Field of Classification Search
CPC ..... A61B 5/0035; A61B 5/004; A61B 5/0066; A61B 5/0071; A61B 5/0086;
(Continued)

(56) References Cited

U.S. PATENT DOCUMENTS

| 8,190,241 B2 | 5/2012 | Ntziachristos et al. |
| 10,568,687 B2 | 2/2020 | Chen et al. |

(Continued)

FOREIGN PATENT DOCUMENTS

| CN | 111693495 A | 9/2020 |
| KR | 102273736 B1 | 7/2021 |

(Continued)

OTHER PUBLICATIONS

Barth et al. 2020 Proc. of SPIE 11222: article 112220J 16 pages (Year: 2020).*

(Continued)

*Primary Examiner* — Keith M Raymond
*Assistant Examiner* — Patrick M Mehl
(74) *Attorney, Agent, or Firm* — QUARLES & BRADY LLP (57) ABSTRACT

A method for detecting inflammatory activity, including: providing a catheter including a near-infrared fluorescence (NIRF) imaging system configured to perform NIRF imaging and an optical coherence tomography (OCT) imaging system configured to perform structural imaging; introducing a near-infrared fluorescent cathepsin-activatable imaging agent into a blood vessel; placing a distal end of the catheter within the blood vessel; obtaining, using the OCT imaging system, structural images of an atherosclerotic (Continued)

plaque within the blood vessel; obtaining, using the NIRF imaging system, NIRF images of the atherosclerotic plaque within the blood vessel; detecting the near-infrared fluorescent cathepsin-activatable imaging agent in the NIRF images; and identifying inflammation within the atherosclerotic plaque based on detecting the near-infrared fluorescent cathepsin-activatable imaging agent in the NIRF images.

13 Claims, 6 Drawing Sheets (52) U.S. Cl.
CPC .......... *A61B 5/0071* (2013.01); *A61B 5/0086* (2013.01); *A61B 5/6852* (2013.01); *G01N 21/6456* (2013.01); *G01N 2201/06113* (2013.01)

(58) Field of Classification Search
CPC ..... A61B 5/6852; A61B 1/043; A61B 5/0073; A61B 5/02007; G01N 21/6456; G01N 2201/06113; G01N 2021/6484
See application file for complete search history.

(56) References Cited

U.S. PATENT DOCUMENTS

| | | | |
|---|---|---|---|
| 11,147,453 B2 | 10/2021 | Yamada et al. | |
| 11,241,155 B2 | 2/2022 | Chen et al. | |
| 11,317,868 B2 | 5/2022 | Caplan et al. | |
| 2011/0152501 A1* | 6/2011 | Weissleder | C12Q 1/6841 530/350 |
| 2016/0228097 A1* | 8/2016 | Jaffer | A61B 8/4416 |
| 2018/0092538 A1 | 4/2018 | Rajan et al. | |
| 2019/0099079 A1 | 4/2019 | Yamada et al. | |
| 2021/0161387 A1 | 6/2021 | Wang et al. | |

FOREIGN PATENT DOCUMENTS

| | | |
|---|---|---|
| WO | 2002056670 A2 | 7/2002 |
| WO | 2020210746 A1 | 10/2020 |
| WO | 2021055837 A1 | 3/2021 |
| WO | 2021230978 A1 | 11/2021 |
| WO | 2022067215 A1 | 3/2022 |

OTHER PUBLICATIONS

Chowdhury et al. 2020 JACC: Basic Translational Sciences 5:685-695 (Year: 2020).*
Garcia-Parajo et al. 2005 NanoBiotechnology 1:113-120 (Year: 2005).*
Khraishah et al. 2020 Frontiers in Cardiovas. Med. 7: article 587100 13 pages (Year: 2020).*
Whitley et al. 2016 Science Translational Med. 8:1-11 (Year: 2016).*
Esfahani, Shadi A., et al. "Optical imaging with a novel cathepsin-activatable probe for enhanced detection of colorectal cancer." American Journal of Nuclear Medicine and Molecular Imaging 9.5 (2019): 230.
Khraishah, Haitham, and Farouc A. Jaffer. "Intravascular molecular imaging: near-infrared fluorescence as a new frontier." Frontiers in Cardiovascular Medicine 7 (2020): 587100.
Kim, Sunwon, et al. "Intracoronary dual-modal optical coherence tomography-near-infrared fluorescence structural-molecular imaging with a clinical dose of indocyanine green for the assessment of high-risk plaques and stent-associated inflammation in a beating coronary artery." European Heart Journal 37.37 (2016): 2833-2844.
Shrivastav, Manisha, et al. "Validation of near infrared fluorescence (NIRF) probes in vivo with dual laser NIRF endoscope." PloS one 13.11 (2018): e0206568.
Ughi, Giovanni J., et al. "Dual modality intravascular optical coherence tomography (OCT) and near-infrared fluorescence (NIRF) imaging: a fully automated algorithm for the distance-calibration of NIRF signal intensity for quantitative molecular imaging." The international journal of cardiovascular imaging 31 (2015): 259-268.
Ughi, Giovanni J., et al. "Clinical characterization of coronary atherosclerosis with dual-modality OCT and near-infrared autofluorescence imaging." JACC: Cardiovascular imaging 9.11 (2016): 1304-1314.
Verjans, Johan W., et al. "Targeted near-infrared fluorescence imaging of atherosclerosis: clinical and intracoronary evaluation of indocyanine green." JACC: Cardiovascular Imaging 9.9 (2016): 1087-1095.
Figueiredo, Jose-Luiz, et al. "Near infrared thoracoscopy of tumoral protease activity for improved detection of peripheral lung cancer." International journal of cancer 118.11 (2006): 2672-2677.
Hara, Tetsuya, and Farouc A. Jaffer. "Intravascular NIRF molecular imaging approaches in coronary artery disease." Current cardiovascular imaging reports 9.4 (2016): 13.
Jaffer, Farouc A., et al. "Two-dimensional intravascular near-infrared fluorescence molecular imaging of inflammation in atherosclerosis and stent-induced vascular injury." Journal of the American College of Cardiology 57.25 (2011): 2516-2526.
Extended European Search Report in EP22861967.2; received on Mar. 6, 2025.

* cited by examiner

INTRAVASCULAR DUAL-MODALITY OCT AND MULTICHANNEL NIRF INFLAMMATION IMAGING

CROSS-REFERENCE TO RELATED APPLICATIONS

The present application represents the U.S. national stage entry of International Patent Application Ser. No. PCT/US2022/041171, filed on Aug. 23, 2022, which is based on and claims priority from U.S. Patent Application Ser. No. 63/236,668, filed on Aug. 24, 2021, the entire disclosure of which is incorporated herein by reference.

STATEMENT REGARDING FEDERALLY SPONSORED RESEARCH

This invention was made with government support under grant numbers R01 HL150538, and R01 HL137913 awarded by the National Institutes of Health. The government has certain rights in the invention.

BACKGROUND

Atherosclerotic plaques in blood vessels such as coronary arteries can slow or block blood flow, and if a plaque ruptures it can cause a blood clot that can lead to complications such as a heart attack or stroke. Thus, improved tools for screening and evaluating the state of plaques are needed.

SUMMARY OF THE INVENTION

Thus, new systems, methods, and apparatus for detecting inflammatory activity in plaques are desirable.

A cathepsin-activated near-infrared fluorescent (NIRF) agent called LUM015 (Lumicell, Inc.) has recently been developed and utilized in clinical trials to enhance intraoperative residual cancer detection but its ability to detect other cathepsin-mediated inflammatory processes has not been evaluated. Accordingly, disclosed herein are embodiments of a system, method, and apparatus for the use of a multi-modal NIRF-optical coherence tomography (OCT) imaging system and catheter to perform the first in vivo imaging of LUM015 inflammatory activity in rabbit models of atherosclerosis.

In one embodiment, the disclosure provides a method for detecting inflammatory activity, including: providing a catheter including a near-infrared fluorescence (NIRF) imaging system configured to perform NIRF imaging and an optical coherence tomography (OCT) imaging system configured to perform structural imaging; introducing a near-infrared fluorescent cathepsin-activatable imaging agent into a blood vessel; placing a distal end of the catheter within the blood vessel; obtaining, using the OCT imaging system, structural images of an atherosclerotic plaque within the blood vessel; obtaining, using the NIRF imaging system, NIRF images of the atherosclerotic plaque within the blood vessel; detecting the near-infrared fluorescent cathepsin-activatable imaging agent in the NIRF images; and identifying inflammation within the atherosclerotic plaque based on detecting the near-infrared fluorescent cathepsin-activatable imaging agent in the NIRF images.

In another embodiment, the disclosure provides a system for detecting inflammatory activity, including: a catheter including a near-infrared fluorescence (NIRF) imaging system configured to perform NIRF imaging and an optical coherence tomography (OCT) imaging system configured to perform structural imaging; and a controller coupled to the NIRF imaging system and the OCT imaging system, the controller configured to: obtain structural images of an atherosclerotic plaque within a blood vessel using the OCT imaging system, the blood vessel having a near-infrared fluorescent cathepsin-activatable imaging agent introduced therein, obtain NIRF images of the atherosclerotic plaque within the blood vessel using the NIRF imaging system, detect the near-infrared fluorescent cathepsin-activatable imaging agent in the NIRF images, and identify inflammation within the atherosclerotic plaque based on detecting the near-infrared fluorescent cathepsin-activatable imaging agent in the NIRF images.

In still another embodiment, the disclosure provides a dual-modality imaging apparatus, including: an optical coherence tomography (OCT) imaging system configured to perform structural imaging, and a dual-channel near-infrared fluorescence (NIRF) imaging system configured to perform NIRF imaging, the dual-channel NIRF imaging system including: a first channel including a first excitation wavelength range and a first detection wavelength range, and a second channel including a second excitation wavelength range different than the first excitation wavelength range, and a second detection wavelength range different than the first detection wavelength range.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments of the disclosed subject matter, mechanisms (which can include systems, methods, and apparatus) for detecting inflammatory activity are provided.

Various embodiments of the disclosure provide in vivo detection of atherosclerotic plaque inflammatory activity using injectable inflammation markers such as LUM015 agent (Lumicell Inc.) and a catheter. LUM015 is a pegylated cathepsin-activated imaging agent containing a Cy5 fluorophore attached to a quencher by a cathepsin-sensitive polypeptide linker. Upon cleavage of the linker by cathepsin proteases, the quencher is released, allowing fluorescence to be detected. In certain embodiments, plaques may be detected and analyzed using a multi-modal optical coherence tomography (OCT) and near-infrared fluorescence (NIRF) imaging system, with light being relayed from the system to tissue via a catheter (e.g. coronary catheter). As discussed further below, a portion of a blood vessel (e.g. a coronary artery) may be imaged using OCT imaging to obtain structural information and also imaged using NIRF imaging to obtain information about levels of fluorescent markers such as LUM015 or ProSense VM110.

In certain embodiments, the NIRF imaging system may use 730 nm excitation and is capable of discriminating plaque inflammatory activity with injected ProSense VM110 (3.5 mg/kg, ex/em 750/770 nm), which is a well-established but clinically unavailable fluorescent probe tor visualizing cathepsin activity. As LUM015 is conjugated to Cy5 (ex/em 649/666 nm), a 647 nm excitation laser was added along with a 708/75 nm detection channel to an embodiment of the imaging system. Atherosclerotic rabbits (n=2) were imaged with the NIRF-OCT catheter following an intravenous injection of 6.2 mg/kg of LUM015 agent (allometrically scaled from a 2 mg/kg human dose). Five-cm pullback NIRF-OCT datasets were acquired in vivo at baseline (i.e. prior to injection) and at 6 and 24 hours after injection. The LUM015 average plaque-to-background ratio was 3.3±1.3 and 2.0±1.0 at 6 and 24 hours, respectively. To investigate the similarity between LUM015 and VM110 targeting of cathepsin-mediated inflammation, both agents were injected and multichannel fluorescence detection (810/90 nm for VM110 and 708/75 nm for LUM015) was utilized, separately acquiring pullbacks from each channel. Using this multichannel approach, co-registered distance-corrected fluorescence carpet maps from rabbits co-injected with LUM015 and VM110 were similar to one another, with a Pearson correlation coefficient of 0.51 and a Mander's overlap coefficient of 0.79. These results indicate that LUM015 may be a viable clinical option for imaging of plaque inflammatory activity in patients, for example in coronary arteries. Furthermore, the present disclosure provides embodiments of a multi-modal clinical OCT-NIRF imaging system and catheter device capable of detecting atherosclerotic plaque inflammatory activity in subjects such as humans or other animals using NIRF inflammation probes such as the LUM015 agent.

As described herein, embodiments of the system capable of LUM015 detection was developed as an improvement over existing dual-modality imaging systems. Among other improvements, an additional channel was added to a multi-modal near-infrared fluorescence (NIRF) and optical coherence tomography (OCT) system to allow concurrent imaging with two different NIRF probes. One channel of the system operates at 730 nm with emission filter 810/90 nm (center wavelength/bandwidth) and a second channel operates at 647 nm with emission filter 708/75 nm (center wavelength/bandwidth). Accordingly, the improved imaging system can obtain structural information using OCT as well as two channels of NIRF information to monitor fluorescence levels of probes such as ProSense VM110 and LUM015.

Certain embodiments of the disclosed system have been used to image rabbits (n=2) imaged at 3 timepoints (baseline, 6, 24 hours). The rabbits were injected with 6.2 mg/kg of LUM015 after co-injection of 3.5 mg/kg of ProSense VM110 after the 6-hour imaging timepoint. In various embodiments, the coronary arteries of the rabbits (n=2) were imaged showing: (1) elevated near-infrared fluorescence (NIRF) at 6 and 24 hours when signal intensity is compared to baseline, and (2) co-registration of fluorescence when compared to sequentially acquired fluorescence carpet maps with a co-injected agent (Prosense VM110) in the 730 nm channel. The time-course data in (1) demonstrates increasing LUM015 signal levels over time and the co-registration data in (2) demonstrates the agreement between the signal obtained using the well-established VM110 probe and the signal obtained using LUM015, which has not previously been shown to serve as an indicator of inflammation in atherosclerotic plaques and thus provides surprising new findings.

In other embodiments, additional rabbits (n=5) were imaged with different excitation laser wavelengths, filters, and study designs.

In various embodiments, a subject may receive a fluorescent cathepsin-activatable imaging agent after which a blood vessel of the subject may be imaged using a catheter probe inserted into the blood vessel in order to identify inflammatory activity. In some embodiments, the fluorescent cathepsin-activatable imaging agent may include one or more of LUM015 or ProSense VM110. In certain embodiments, the subject may include a human or other animal. In some embodiments, the blood vessel may include an artery where the artery may be a coronary artery. In particular embodiments, the blood vessel may be imaged to identify a plaque such as an atherosclerotic plaque.

The catheter probe may include structural imaging and fluorescence imaging capabilities for imaging within the vessel. The structural imaging may be performed using an interferometric imaging procedure such as optical coherence tomography (OCT). The fluorescence imaging may be near-infrared fluorescence (NIRF) imaging and may be performed at one or more wavelength ranges, or channels. In some embodiments, the NIRF imaging may be performed at two or more wavelength ranges or channels to facilitate the use of multiple different agents in order to obtain additional information. In certain embodiments, a first channel of the NIRF imaging system may include a first source which provides illumination in a range between 640 nm and 660 nm and may provide a detection range between 670 nm and 745 nm, and in particular embodiments the source provides illumination at 647 nm with an illumination filter centered at 708 nm with a width of 75 nm. In some embodiments, a second channel of the NIRF system may include a second source which provides illumination in a range between 720 nm and 740 nm and may provide a detection range between 765 nm and 855 nm, and in particular embodiments the source provides illumination at 730 nm with an illumination filter centered at 810 nm with a width of 90 nm.

Figure 1:
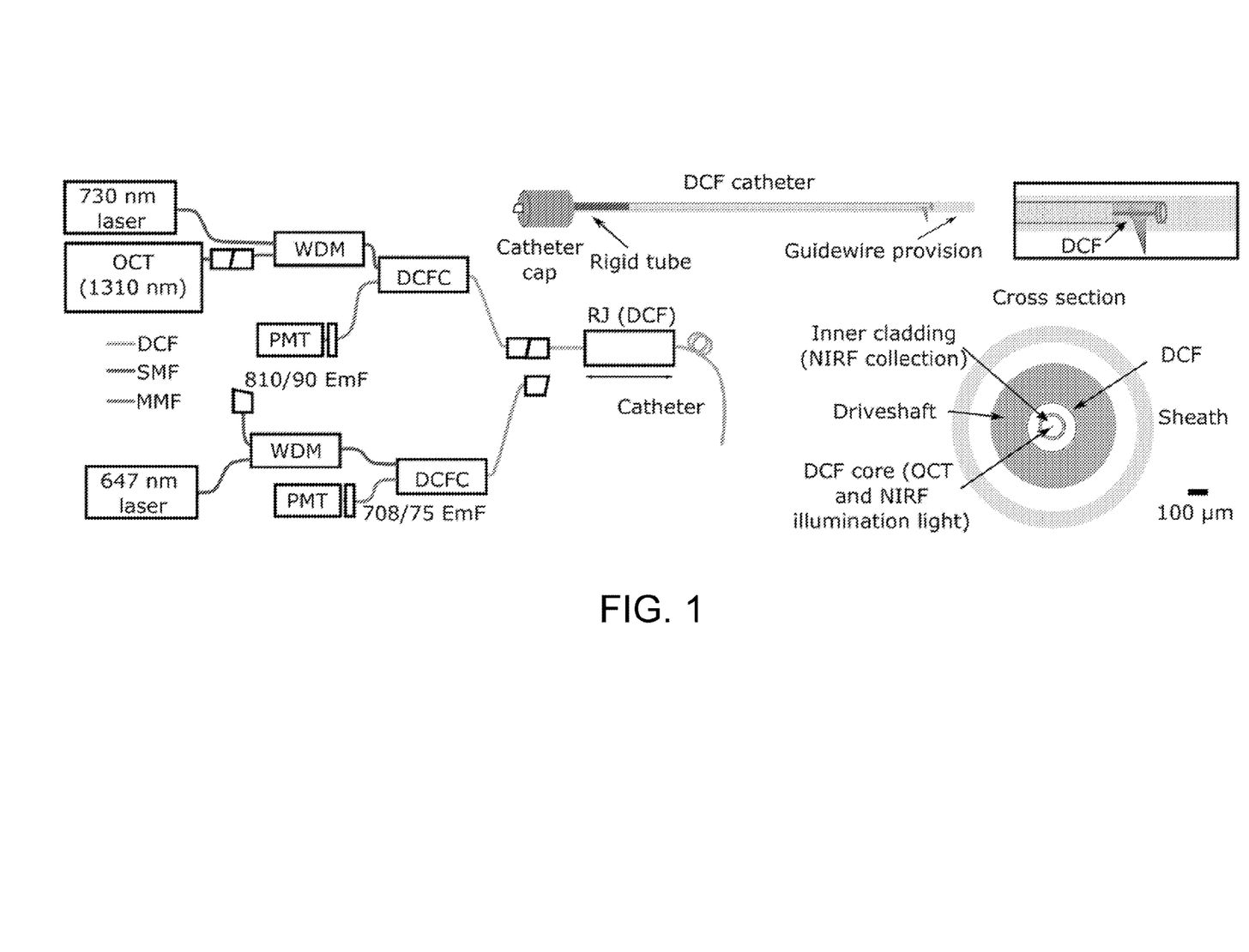
FIG. 1 shows an optical schematic of a multi-modal near infrared fluorescence optical coherence tomography (NIRF-OCT) detection system according to certain constructions of the disclosure. OCT—OCT imaging system including a laser source, OCT detection electronics and optics. WDM—Wavelength division multiplexer, DCF—double clad fiber, SMF—single mode fiber, MMF—multimode fiber, DCFC—double clad fiber coupler, RJ (DCF)—double clad fiber based contact rotary junction. EmF—emission filter, PMT—photo multiplier tube.

In various embodiments, one or more agents may be introduced into the subject and, after a delay of between 30 minutes and 72 hours following the introduction of the agent into the subject, the catheter probe may be introduced into the blood vessel such that a distal end of the probe (which includes the optical components for collecting image information, see FIG. 1) is in a segment of the blood vessel containing or suspected to contain a plaque to obtain image information. In certain embodiments, the delay between introduction of the agent and obtaining image information may be between 6 hours and 24 hours. In some embodiments, one or more baseline images (e.g. containing structural and/or one or more channels of fluorescence imaging information) may be obtained prior to the introduction of one or more agents into the subject. The baseline images may be analyzed and used to determine a baseline appearance of the blood vessel tissue and/or presence of background fluorescence levels at the wavelengths used in the one or more fluorescence imaging channels.

In some embodiments, the probe may capture structural imaging information (e.g. using OCT) along with one or more channels of fluorescence imaging information (e.g. using NIRF). In order to correct for possible variations in fluorescence intensity in the fluorescence imaging information that may arise as a result of the distance between the distal end of the probe and the blood vessel structures/tissue, the fluorescence imaging information may be distance-corrected based on distance information obtained from the structural imaging information. The structural imaging information as well as one or more channels of fluorescence imaging information (possibly distance corrected) may be presented in separate images and/or may be combined or merged into hybrid images with structural and or multichannel information presented in a single image.

In various embodiments, the agent may be detected in the image or images that are produced which include fluorescence intensity information. In certain embodiments, detection may be performed by a user (e.g. a clinician) and/or by software (e.g. automated image analysis software) to determine levels of signal and to relate the levels to presence of inflammation in the blood vessel. In some embodiments, the level of inflammation may in turn be related to the presence of a plaque and/or to a level of risk that the plaque may burst.

Examples

The following are non-limiting examples according to certain embodiments of the disclosure.

Optical System

The optical system uses two separate near-infrared fluorescence (NIRF) detection channels at 647 nm and 730 nm for detection of LUM015 and VM110, respectively. Light generated by the source of an Axsun OCT system (Axsun, A19012482, 100 KHz A-line rate, 1310 nm center wavelength) is combined with light from a fluorescence excitation laser (730 nm: QPhotonics, QFLD-730-20S 02.17.467, 647 nm: OBIS LX 647 1193843) via a wavelength division multiplexer (Thorlabs Inc., W980S330A1A). The light is then guided into the inner core of a dual clad fiber (DCF, Nufern SM-9/105/125-20A) by a DCF coupler (DCFC, Thorlabs, DC1300LEFA). A DCF-based fiber optic rotary junction (RJ, Princetel Inc., MJXAP-SAPB-131-DCL-005-FA) allows light to be transmitted between the core and inner cladding of stationary and rotating fibers. An in-house-made ball lens, angle polished to 52 degrees, is used to focus the light on tissue.

Returning OCT light and fluorescence emission are collected by the ball lens. OCT light is guided back to the Axsun system, and fluorescence emission is guided into the inner cladding of the DCF. The DCF separates the emission from excitation and guides the light to a custom photomultiplier tube (PMT, Hamamatsu) via an emission filter (EmF, 730 channel: Chroma 810/90 ET Bandpass, 647 channel: Semrock FF01-708/75-25). An onboard digitizer allows data to be collected by the Axsun which is then recorded and displayed in real-time by a PC. A data acquisition card (DAQ, NI, USB-6341 OEM) digitizes fluorescence emission collected by the PMT. Two connectors allow an operator to change between detection channels, one between a DCFC and RJ, and one connecting the OCT console to the WDM.

The catheter is made of a driveshaft, sheath, rigid tube, and cap. The fiber is guided by the inner lumen of the driveshaft which is inside the sheath. A rapid exchange guidewire provision, at the most distal part of the sheath allows the catheter to be inserted into the animal via a guidewire. Inside the guidewire provision is a radio-opaque marker. The rigid metal tube as well as cap transition the interface between the rotary junction, driveshaft, and sheath. The motor, cap, and RJ are mounted on a motorized pullback stage, when the stage is translated the driveshaft is translated in the sheath. The motor (Faulhaber MCBL3006SAESRS) delivers torque to the rotary junction spinning the driveshaft. The driveshaft spins circularly, leading to a helical scan pattern when the driveshaft is pulled back through the sheath.

Animal Tests

New Zealand White Rabbits were used as the animal model for atherosclerosis. The rabbits developed lesions after balloon de-endothelialization injury which was then followed by a high cholesterol diet following the procedure described in Ughi, G. J., et al. ("Dual modality intravascular optical coherence tomography (OCT) and near-infrared fluorescence (NIRF) imaging: a fully automated algorithm for the distance-calibration of NIRF signal intensity for quantitative molecular imaging." Intl. J. Cardiovasc. Imaging, 2015. 31 (2): p. 259-268, incorporated herein by reference in its entirety). The near infrared fluorescence (NIRF) optical coherence tomography (OCT) catheter was used to image 80 mm lengths of each animals' aorta. The fluorescence intensity was calibrated using phantoms made using AlexaFluor 647 dissolved in phosphate buffered saline (PBS) and the resulting carpet maps were distance corrected (Ughi et al.), that is, the intensity of the fluorescence signal was adjusted based on the distance of the tissue from the probe at each location as determined from the OCT structural imaging information and calibrations based on imaging phantoms. The rabbits were imaged at all time points using the 647 nm channel of the two-channel detection system shown in FIG. 1, and at 24 hours post injection of VM110 in the 730 nm channel along with the 647 nm channel.

Figure 2:
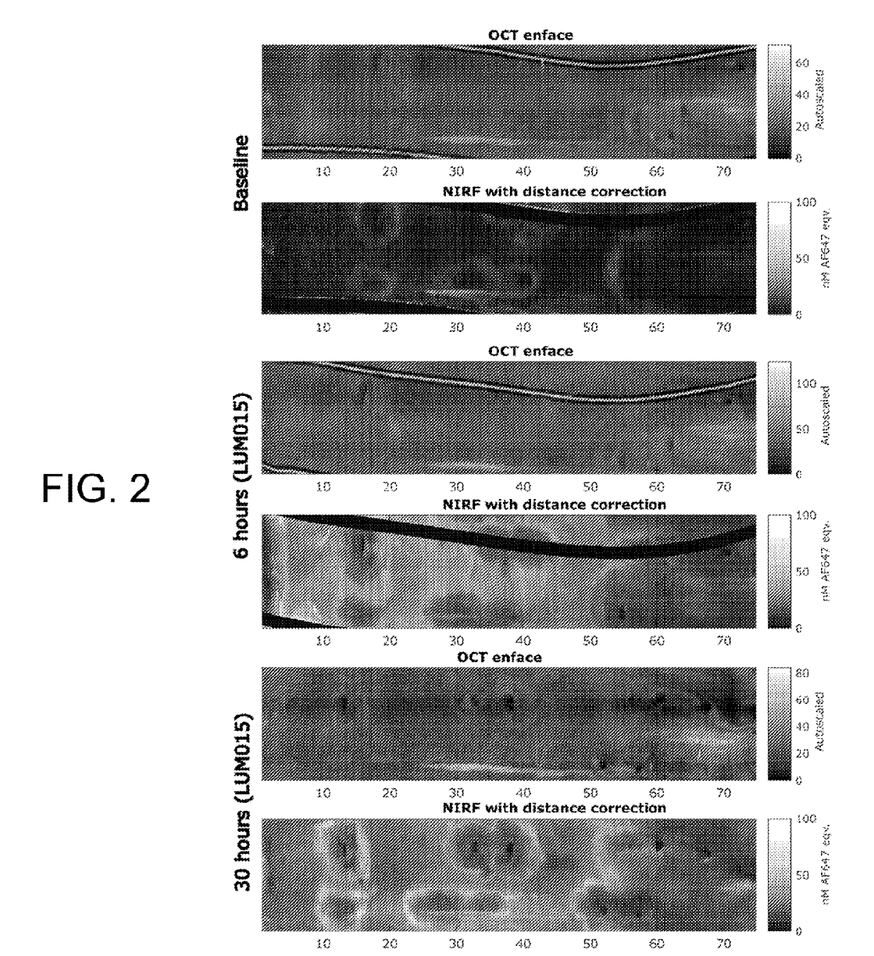
FIG. 2 shows intravascular images of an atherosclerotic plaque acquired in a rabbit model. A rabbit was injected with 6.2 mg/kg LUM015 agent after baseline imaging. Images were acquired in the 647 nm channel at baseline, 6 hours, and 24 hours. Fluorescence maps were distance corrected and calibrated by dipping the catheter in the center of a large conical tube phantom filled with known concentrations of AlexaFluor 647 dissolved in phosphate-buffered saline.
Figure 3:
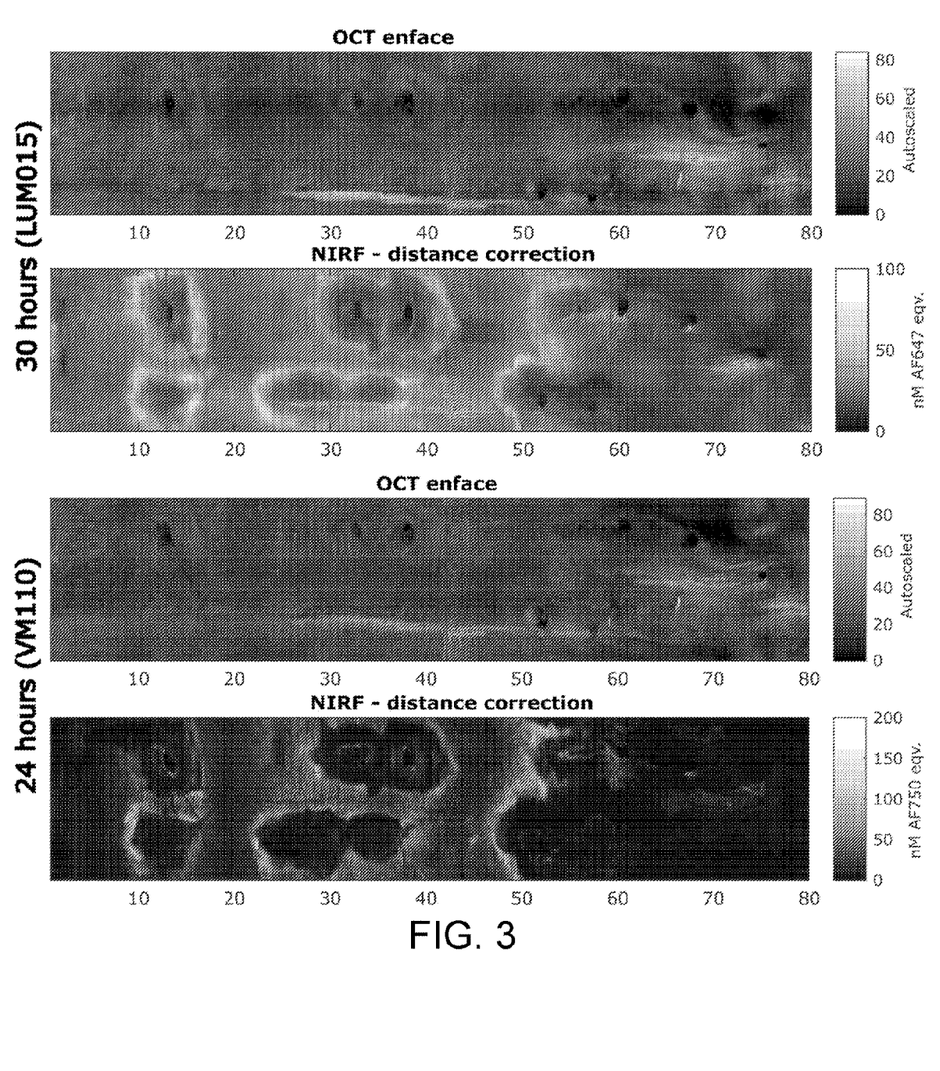
FIG. 3 shows intravascular images of an atherosclerotic plaque acquired in a rabbit model. A rabbit was injected with 6.2 mg/kg LUM015 agent, and, 6 hours later, was injected with 3.5 mg/kg of ProSense VM110. Images shown were acquired in the 730 and 647 nm channels 30 hours after the LUM015 injection. Fluorescence maps were distance corrected and calibrated by dipping the catheter in the center of a large conical tube phantom filled with known concentrations of AlexaFluor 647 (647 nm channel) and AlexaFluor 750 (730 nm channel) each dissolved in phosphate-buffered saline

The first imaging time point was obtained prior to injection of any fluorescent contrast agents at baseline. Immediately after baseline imaging, the LUM015 agent (6.2 mg/kg) was injected into the rabbit and six hours later imaging was performed again. VM110 (3.5 mg/kg) was injected immediately after the 6-hour imaging was performed. Thirty hours after the injection of the Lumicell LUM015 agent final imaging was performed. At each timepoint imaging was performed separately using each channel (647 nm and 730 nm). FIG. 2 shows the signal intensity increase as the agent was taken up (note the increasing intensity of the NIRF images from top to bottom in FIG. 2), and FIG. 3 shows a comparison of fluorescence intensity between LUM015 and VM110 acquired with the two detector channels, namely the 647 nm channel to image LUM015 levels (FIG. 3, top) and the 730 nm channel to image ProSense VM110 levels (FIG. 3, bottom). The fact that the distance corrected fluorescence intensity in the two channels is similar, and there is a rise compared to background, indicates that LUM015 serves as an indicator of plaque inflammation via its cathepsin protease sensitivity.

Computing System

Figure 4:
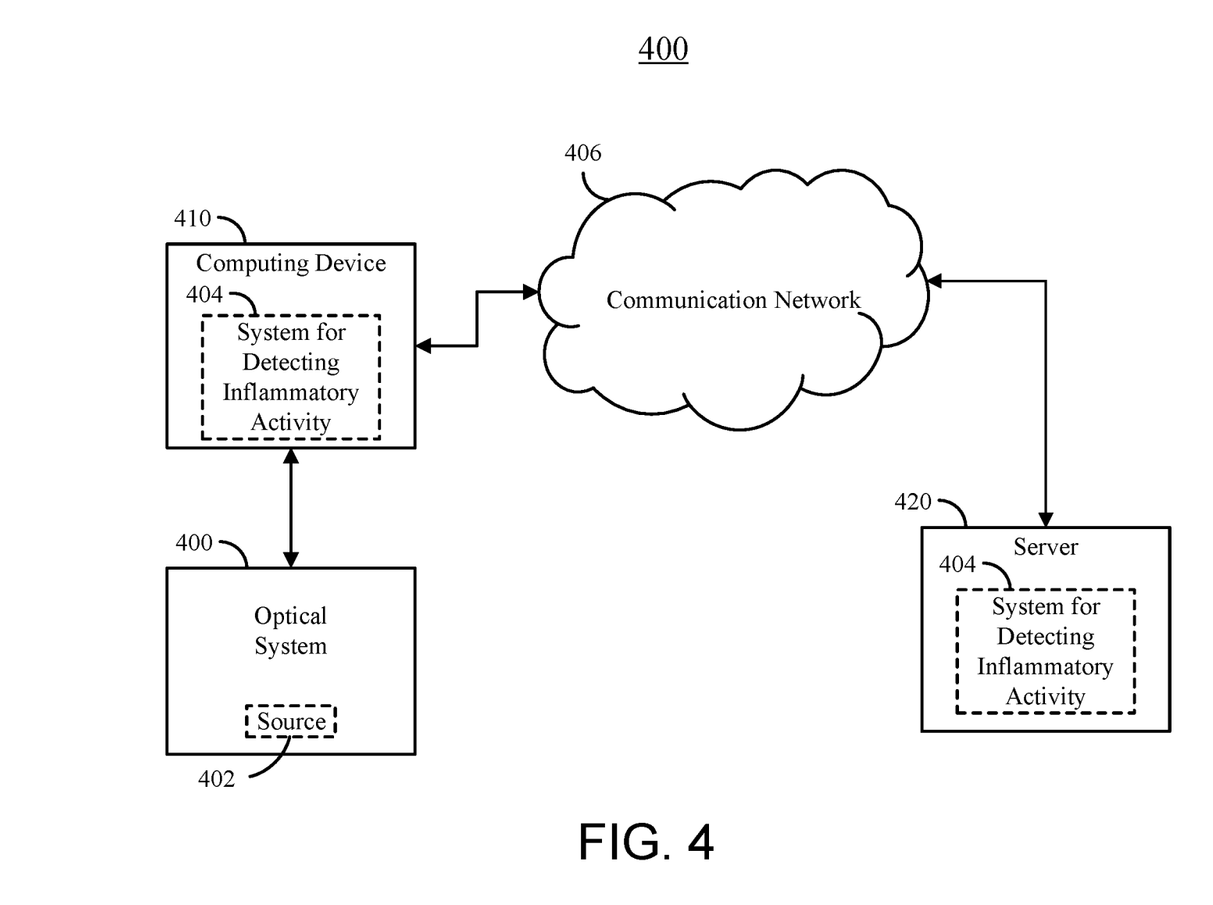
FIG. 4 shows an example of a system for detecting inflammatory activity in plaques in accordance with some embodiments of the disclosed subject matter.

Turning to FIG. 4, an example 400 of a system (e.g. a data collection and processing system) for detecting inflammatory activity in plaques is shown in accordance with some embodiments of the disclosed subject matter. As shown in FIG. 4, a computing device 410 can receive interferometric and/or fluorescence data from an optical system 400. In some embodiments, computing device 410 can execute at least a portion of a system for detecting inflammatory activity in plaques 404 to determine an absolute depth based on the interferometric and/or fluorescence data received from optical system 400. Additionally or alternatively, in some embodiments, computing device 410 can communicate information about the interferometric and/or fluorescence data received from optical system 400 to a server 420 over a communication network 406, which can execute at least a portion of system for detecting inflammatory activity in plaques 404 to detect inflammatory activity based on the interferometric and/or fluorescence data. In some such embodiments, server 420 can return information to computing device 410 (and/or any other suitable computing device) indicative of an output of system for detecting inflammatory activity in plaques 404, such as interferometric or fluorescence information. This information may be transmitted and/or presented to a user (e.g. a researcher, an operator, a clinician, etc.) and/or may be stored (e.g. as part of a research database or a medical record associated with a subject).

In some embodiments, computing device 410 and/or server 420 can be any suitable computing device or combination of devices, such as a desktop computer, a laptop computer, a smartphone, a tablet computer, a wearable computer, a server computer, a virtual machine being executed by a physical computing device, etc. As described herein, system for detecting inflammatory activity in plaques 404 can present information about the interferometric data and/or the fluorescence information to a user (e.g., researcher and/or physician).

In some embodiments, optical system 400 may include one or more electro-magnetic radiation source 402, which can be any source suitable for optical interferometry such as OCT and/or for NIRF imaging. In other embodiments, electro-magnetic radiation source 402 can be local to computing device 410. For example, electro-magnetic radiation source 402 may be incorporated with computing device 410 (e.g., computing device 410 can be configured as part of a device for capturing and/or storing optical interferometric and/or fluorescence information). As another example, electro-magnetic radiation source 402 may be connected to computing device 410 by a cable, a direct wireless link, etc. Additionally or alternatively, in some embodiments, electro-magnetic radiation source 402 can be located locally and/or remotely from computing device 410, and can communicate information to computing device 410 (and/or server 420) via a communication network (e.g., communication network 406).

In some embodiments, communication network 406 can be any suitable communication network or combination of communication networks. For example, communication network 406 can include a Wi-Fi network (which can include one or more wireless routers, one or more switches, etc.), a peer-to-peer network (e.g., a Bluetooth network), a cellular network (e.g., a 4G network, a 5G network, etc., complying with any suitable standard, such as CDMA, GSM, LTE, LTE Advanced, WiMAX, etc.), a wired network, etc. In some embodiments, communication network 406 can be a local area network, a wide area network, a public network (e.g., the Internet), a private or semi-private network (e.g., a corporate or university intranet), any other suitable type of network, or any suitable combination of networks. Communications links shown in FIG. 4 can each be any suitable communications link or combination of communications links, such as wired links, fiber optic links, Wi-Fi links, Bluetooth links, cellular links, etc.

Figure 5:
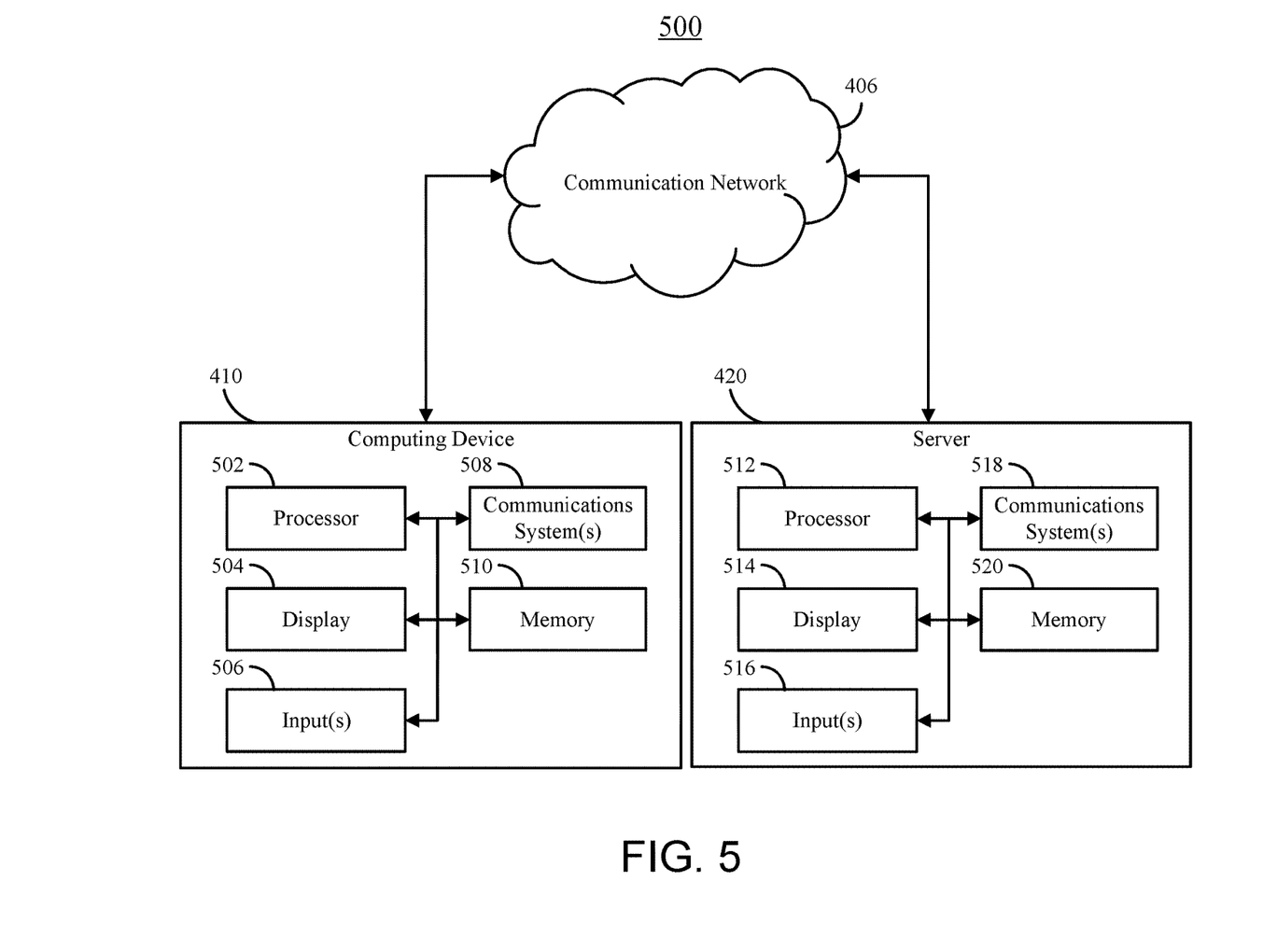
FIG. 5 shows an example of hardware that can be used to implement computing device and server in accordance with some embodiments of the disclosed subject matter.

FIG. 5 shows an example 500 of hardware that can be used to implement computing device 410 and server 420 in accordance with some embodiments of the disclosed subject matter. As shown in FIG. 5, in some embodiments, computing device 410 can include a processor 502, a display 504, one or more inputs 506, one or more communication systems 508, and/or memory 510. In some embodiments, processor 502 can be any suitable hardware processor or combination of processors, such as a central processing unit, a graphics processing unit, etc. In some embodiments, display 504 can include any suitable display devices, such as a computer monitor, a touchscreen, a television, etc. In some embodiments, inputs 506 can include any suitable input devices and/or sensors that can be used to receive user input, such as a keyboard, a mouse, a touchscreen, a microphone, etc.

In some embodiments, communications systems 508 can include any suitable hardware, firmware, and/or software for communicating information over communication network 406 and/or any other suitable communication networks. For example, communications systems 508 can include one or more transceivers, one or more communication chips and/or chip sets, etc. In a more particular example, communications systems 508 can include hardware, firmware and/or software that can be used to establish a Wi-Fi connection, a Bluetooth connection, a cellular connection, an Ethernet connection, etc.

In some embodiments, memory 510 can include any suitable storage device or devices that can be used to store instructions, values, etc., that can be used, for example, by processor 502 to present content using display 504, to communicate with server 420 via communications system(s) 508, etc. Memory 510 can include any suitable volatile memory, non-volatile memory, storage, or any suitable combination thereof. For example, memory 510 can include RAM, ROM, EEPROM, one or more flash drives, one or more hard disks, one or more solid state drives, one or more optical drives, etc. In some embodiments, memory 510 can have encoded thereon a computer program for controlling operation of computing device 410. In such embodiments, processor 502 can execute at least a portion of the computer program to present content (e.g., images, user interfaces, graphics, tables, etc.), receive content from server 420, transmit information to server 420, etc.

In some embodiments, server 420 can include a processor 512, a display 514, one or more inputs 516, one or more communications systems 518, and/or memory 520. In some embodiments, processor 512 can be any suitable hardware processor or combination of processors, such as a central processing unit, a graphics processing unit, etc. In some embodiments, display 514 can include any suitable display devices, such as a computer monitor, a touchscreen, a television, etc. In some embodiments, inputs 516 can include any suitable input devices and/or sensors that can be used to receive user input, such as a keyboard, a mouse, a touchscreen, a microphone, etc.

In some embodiments, communications systems 518 can include any suitable hardware, firmware, and/or software for communicating information over communication network 406 and/or any other suitable communication networks. For example, communications systems 518 can include one or more transceivers, one or more communication chips and/or chip sets, etc. In a more particular example, communications systems 518 can include hardware, firmware and/or software that can be used to establish a Wi-Fi connection, a Bluetooth connection, a cellular connection, an Ethernet connection, etc.

In some embodiments, memory 520 can include any suitable storage device or devices that can be used to store instructions, values, etc., that can be used, for example, by processor 512 to present content using display 514, to communicate with one or more computing devices 410, etc. Memory 520 can include any suitable volatile memory, non-volatile memory, storage, or any suitable combination thereof. For example, memory 520 can include RAM, ROM, EEPROM, one or more flash drives, one or more hard disks, one or more solid state drives, one or more optical drives, etc. In some embodiments, memory 520 can have encoded thereon a server program for controlling operation of server 420. In such embodiments, processor 512 can execute at least a portion of the server program to transmit information and/or content (e.g., results of a tissue identification and/or classification, a user interface, etc.) to one or more computing devices 410, receive information and/or content from one or more computing devices 410, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

In some embodiments, the optical signals are detected by photodiodes. It should be recognized that any opto-electronic conversion device including but not limited to photo detectors, photodiodes, line-scan and two-dimensional cameras, and photodiode arrays can be used to perform this detection function.

It should be noted that, as used herein, the term mechanism can encompass hardware, software, firmware, or any suitable combination thereof.

Process for Detecting Inflammatory Activity in Plaques

Figure 6:
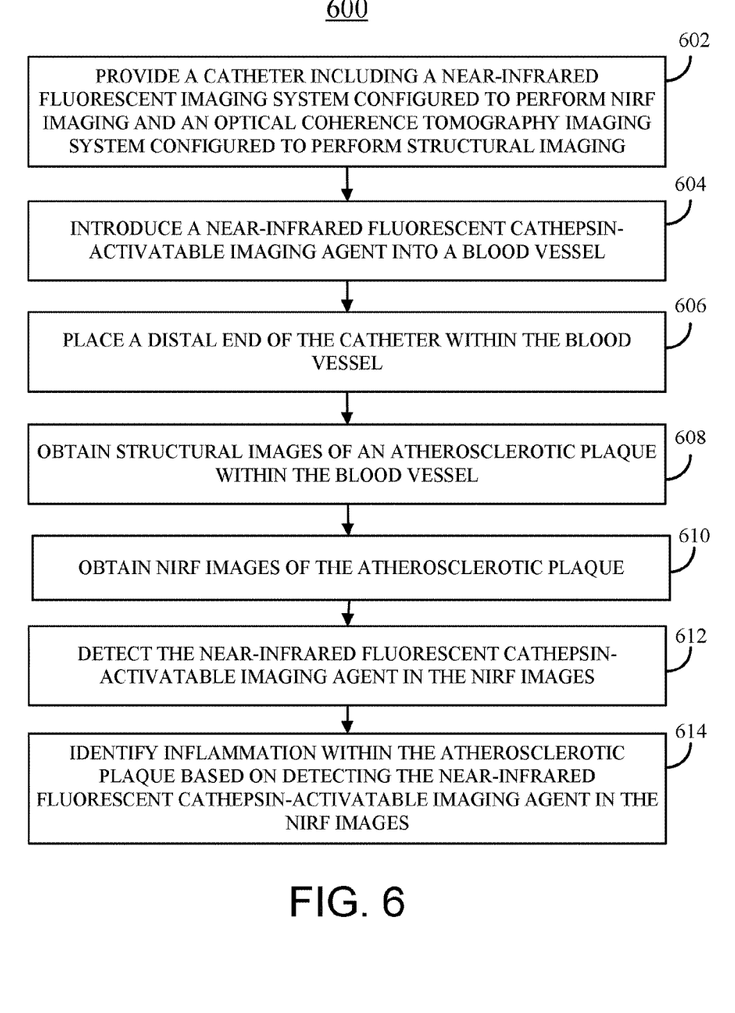
FIG. 6 shows an example of a process for detecting inflammatory activity in plaques in accordance with some embodiments of the disclosed subject matter.

FIG. 6 shows an example 600 of a process for detecting inflammatory activity in plaques in accordance with some embodiments of the disclosed subject matter. As shown in FIG. 6, at 602, process 600 can provide a catheter including a near-infrared fluorescence (NIRF) imaging system configured to perform NIRF imaging and an optical coherence tomography (OCT) imaging system configured to perform structural imaging. At 604, process 600 can introduce a near-infrared fluorescent cathepsin-activatable imaging agent into a blood vessel. At 606, process 600 can place a distal end of the catheter within the blood vessel. At 608, process 600 can obtain structural images of an atherosclerotic plaque within the blood vessel, which may be performed using the OCT imaging system. At 610, process 600 can obtain NIRF images of the atherosclerotic plaque, which may be performed using the NIRF imaging system. At 612, process 600 can detect the near-infrared fluorescent cathepsin-activatable imaging agent in the NIRF images. Finally, at 614, process 600 can identify inflammation within the atherosclerotic plaque based on detecting the near-infrared fluorescent cathepsin-activatable imaging agent in the NIRF images.

It should be understood that the above described steps of the process of FIG. 6 can be executed or performed in any order or sequence not limited to the order and sequence shown and described in the figures. Also, some of the above steps of the processes of FIG. 6 can be executed or performed substantially simultaneously where appropriate or in parallel to reduce latency and processing times.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A method for detecting inflammatory activity, comprising:
   providing a catheter comprising a near-infrared fluorescence (NIRF) imaging system configured to perform NIRF imaging and an optical coherence tomography (OCT) imaging system configured to perform structural imaging,
   wherein the NIRF imaging system comprises:
      a first channel which provides excitation light between 640 nm and 660 nm and detects emitted light between 670 nm and 745 nm, and
      a second channel which provides excitation light between 720 nm and 740 nm and detects emitted light between 765 nm and 855 nm;
   introducing a near-infrared fluorescent cathepsin-activatable imaging agent comprising at least one of a LUM015 agent or a VM110 agent into a blood vessel;
   placing a distal end of the catheter within the blood vessel;
   obtaining, using the OCT imaging system, structural images of an atherosclerotic plaque within the blood vessel;
   obtaining, using the NIRF imaging system, NIRF images of the atherosclerotic plaque within the blood vessel comprising:
      illuminating the atherosclerotic plaque with the excitation light between 640 nm and 660 nm, detecting emitted light from the LUM015 agent in the atherosclerotic plaque between 670 nm and 745 nm, obtaining the NIRF images of the atherosclerotic plaque based on detecting the emitted light from the LUM015 agent, illuminating the atherosclerotic plaque with the excitation light between 720 nm and 740 nm, detecting emitted light from the VM110 agent in the atherosclerotic plaque between 765 nm and 855 nm, and obtaining the NIRF images of the atherosclerotic plaque based on detecting the emitted light from the VM110 agent;

detecting the near-infrared fluorescent cathepsin-activatable imaging agent comprising at least one of the LUM015 agent or the VM110 agent in the NIRF images; and identifying inflammation within the atherosclerotic plaque based on detecting the near-infrared fluorescent cathepsin-activatable imaging agent comprising at least one of the LUM015 agent or the VM110 agent in the NIRF images.

2. The method of claim 1, wherein obtaining NIRF images of the atherosclerotic plaque further comprises:
illuminating the atherosclerotic plaque with the excitation light at 647 nm.

3. The method of claim 1, wherein identifying inflammation within the atherosclerotic plaque further comprises:
identifying inflammation within the atherosclerotic plaque based on detecting the emitted light from the LUM015 agent and the VM110 agent in the NIRF images.

4. The method of claim 1, wherein introducing a near-infrared fluorescent cathepsin-activatable imaging agent into a blood vessel further comprises:
waiting between 30 minutes and 72 hours after introducing the near-infrared fluorescent cathepsin-activatable imaging agent into the blood vessel before placing the distal end of the catheter within the blood vessel.

5. The method of claim 1, wherein detecting the near-infrared fluorescent cathepsin-activatable imaging agent in the NIRF images further comprises:
applying a distance correction to the NIRF images based on the structural images of the atherosclerotic plaque to provide distance-corrected NIRF images, and
detecting the near-infrared fluorescent cathepsin-activatable imaging agent in the distance-corrected NIRF images.

6. A system for detecting inflammatory activity, comprising:
a catheter comprising a near-infrared fluorescence (NIRF) imaging system configured to perform NIRF imaging and an optical coherence tomography (OCT) imaging system configured to perform structural imaging,
wherein the NIRF imaging system comprises:
a first channel which provides excitation light between 640 nm and 660 nm and detects emitted light between 670 nm and 745 nm, and
a second channel which provides excitation light between 720 nm and 740 nm and detects emitted light between 765 nm and 855 nm; and
a controller coupled to the NIRF imaging system and the OCT imaging system, the controller configured to:
obtain structural images of an atherosclerotic plaque within a blood vessel using the OCT imaging system, the blood vessel having a near-infrared fluorescent cathepsin-activatable imaging agent comprising at least one of a LUM015 agent or a VM110 agent introduced therein, obtain NIRF images of the atherosclerotic plaque within the blood vessel using the NIRF imaging system comprising:
illuminating the atherosclerotic plaque with the excitation light between 640 nm and 660 nm,
detecting emitted light from the LUM015 agent in the atherosclerotic plaque between 670 nm and 745 nm,
obtaining the NIRF images of the atherosclerotic plaque based on detecting the emitted light from the LUM015 agent,
illuminating the atherosclerotic plaque with the excitation light between 720 nm and 740 nm,
detecting emitted light from the VM110 agent in the atherosclerotic plaque between 765 nm and 855 nm, and
obtaining the NIRF images of the atherosclerotic plaque based on detecting the emitted light from the VM110 agent,
detect the near-infrared fluorescent cathepsin-activatable imaging agent comprising at least one of the LUM015 agent or the VM110 agent in the NIRF images, and
identify inflammation within the atherosclerotic plaque based on detecting the near-infrared fluorescent cathepsin-activatable imaging agent comprising at least one of the LUM015 agent or the VM110 agent in the NIRF images.

7. The system of claim 6, wherein the first channel of the NIRF imaging system provides the excitation light at 647 nm.

8. The system of claim 6, wherein the controller, when identifying inflammation within the atherosclerotic plaque, is further configured to:
identify inflammation within the atherosclerotic plaque based on detecting the emitted light from the LUM015 agent and the VM110 agent in the NIRF images.

9. The system of claim 6, wherein the controller, when detecting the near-infrared fluorescent cathepsin-activatable imaging agent in the NIRF images, is further configured to:
apply a distance correction to the NIRF images based on the structural images of the atherosclerotic plaque to provide distance-corrected NIRF images, and
detect the near-infrared fluorescent cathepsin-activatable imaging agent in the distance-corrected NIRF images.

10. A dual-modality imaging apparatus, comprising:
an optical coherence tomography (OCT) imaging system configured to perform structural imaging, and
a dual-channel near-infrared fluorescence (NIRF) imaging system configured to perform NIRF imaging, the dual-channel NIRF imaging system including:
a first channel including a first excitation wavelength range and a first detection wavelength range, and
a second channel including a second excitation wavelength range different than the first excitation wavelength range, and a second detection wavelength range different than the first detection wavelength range,
wherein the dual-channel NIRF imaging system and the OCT imaging system are disposed within a catheter, and wherein the apparatus further comprises a controller coupled to the dual-channel NIRF imaging system and the OCT imaging system, wherein the controller is configured to:
  obtain structural images of a sample comprising an atherosclerotic plaque within a blood vessel having a first near-infrared fluorescent cathepsin-activatable imaging agent and a second near-infrared fluorescent cathepsin-activatable imaging agent introduced therein using the OCT imaging system,
  obtain first NIRF images of the first near-infrared fluorescent cathepsin-activatable imaging agent in the sample using the first channel of the NIRF imaging system,
  obtain second NIRF images of the second near-infrared fluorescent cathepsin-activatable imaging agent in the sample using the second channel of the NIRF imaging system,
  detect the first near-infrared fluorescent cathepsin-activatable imaging agent in the first NIRF images and the second near-infrared fluorescent cathepsin-activatable imaging agent in the second NIRF images, and
  identify inflammation within the atherosclerotic plaque based on detecting the first near-infrared fluorescent cathepsin-activatable imaging agent in the first NIRF images and the second near-infrared fluorescent cathepsin-activatable imaging agent in the second NIRF images.

11. The dual-modality imaging apparatus of claim 10, wherein the first near-infrared fluorescent cathepsin-activatable imaging agent comprises a LUM015 agent, and
  wherein the second near-infrared fluorescent cathepsin-activatable imaging agent comprises a VM110 agent.

12. The dual-modality imaging apparatus of claim 11, wherein the first excitation wavelength range of the first channel of the dual-channel NIRF imaging system is between 640 nm and 660 nm and wherein the first detection wavelength range is between 670 nm and 745 nm, and
  wherein the second excitation wavelength range of the second channel of the dual-channel NIRF imaging system is between 720 nm and 740 nm and wherein the second detection wavelength range is between 765 nm and 855 nm, and
  wherein the controller, when obtaining the first NIRF images of the first near-infrared fluorescent cathepsin-activatable imaging agent in the sample, is further configured to:
    illuminate the atherosclerotic plaque with light in the first excitation wavelength range of between 640 nm and 660 nm,
    detect emitted light from the LUM015 agent in the atherosclerotic plaque in the first detection wavelength range of between 670 nm and 745 nm,
    obtain the first NIRF images of the atherosclerotic plaque based on detecting the emitted light from the LUM015 agent,
  wherein the controller, when obtaining the second NIRF images of the second near-infrared fluorescent cathepsin-activatable imaging agent in the sample, is further configured to:
    illuminate the atherosclerotic plaque with light in the second excitation wavelength range of between 720 nm and 740 nm,
    detect emitted light from the VM110 agent in the atherosclerotic plaque in the second detection wavelength range of between 765 nm and 855 nm,
    obtain the second NIRF images of the atherosclerotic plaque based on detecting the emitted light from the VM110 agent, and
  wherein the controller, when identifying inflammation within the atherosclerotic plaque based on detecting the first near-infrared fluorescent cathepsin-activatable imaging agent in the first NIRF images and the second near-infrared fluorescent cathepsin-activatable imaging agent in the second NIRF images, is further configured to:
    identify inflammation within the atherosclerotic plaque based on detecting the emitted light from the LUM015 agent in the first NIRF images and the VM110 agent in the second NIRF images.

13. The dual-modality imaging apparatus of claim 12, wherein the first channel of the dual-channel NIRF imaging system provides the excitation light at 647 nm and wherein the second channel of the dual-channel NIRF imaging system provides the excitation light at 730 nm, and
  wherein the controller, when detecting the near-infrared fluorescent cathepsin-activatable imaging agent in the first NIRF images and the second NIRF images, is further configured to:
    apply a distance correction to the first NIRF images and the second NIRF images based on the structural images of the atherosclerotic plaque to provide distance-corrected first NIRF images and distance-corrected second NIRF images, and
    detect the near-infrared fluorescent cathepsin-activatable imaging agent in the distance-corrected first NIRF images and the distance-corrected second NIRF images.

* * * * *